United States Patent
Kuroe

(10) Patent No.: US 10,598,240 B2
(45) Date of Patent: Mar. 24, 2020

(54) THERMOSETTING RESIN COMPOSITION, FRICTION MATERIAL AND METHOD FOR PRODUCING THERMOSETTING RESIN COMPOSITION

(71) Applicant: AKEBONO BRAKE INDUSTRY CO., LTD., Tokyo (JP)

(72) Inventor: Motoki Kuroe, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 53 days.

(21) Appl. No.: 15/659,684

(22) Filed: Jul. 26, 2017

(65) Prior Publication Data

US 2018/0038436 A1    Feb. 8, 2018

(30) Foreign Application Priority Data

Aug. 4, 2016    (JP) .................. 2016-153748

(51) Int. Cl.
| | |
|---|---|
| *F16D 69/02* | (2006.01) |
| *C08L 97/00* | (2006.01) |
| *C08L 61/06* | (2006.01) |
| *C08L 71/00* | (2006.01) |

(52) U.S. Cl.
CPC ........... *F16D 69/026* (2013.01); *C08L 61/06* (2013.01); *C08L 71/00* (2013.01); *C08L 97/00* (2013.01); *C08L 97/005* (2013.01); *C08L 2205/16* (2013.01)

(58) Field of Classification Search
CPC ......... C08L 97/00; C08L 97/005; C08L 97/02
See application file for complete search history.

(56) References Cited

U.S. PATENT DOCUMENTS

| | | | |
|---|---|---|---|
| 4,239,666 A | 12/1980 | Jacko et al. | |
| 5,416,140 A * | 5/1995 | Columbus | C09D 131/04 206/813 |
| 6,461,469 B1 | 10/2002 | Symons | |
| 7,276,591 B2 * | 10/2007 | Yao | C08H 8/00 527/103 |
| 2005/0027043 A1 | 2/2005 | Yao | |
| 2008/0021155 A1 | 1/2008 | Bono et al. | |
| 2013/0225719 A1 * | 8/2013 | Kuroe | F16D 69/026 523/149 |
| 2013/0324644 A1 * | 12/2013 | Batchelor | C08L 97/005 524/14 |
| 2016/0230008 A1 | 8/2016 | Murai | |
| 2017/0253740 A1 | 9/2017 | Murai et al. | |

FOREIGN PATENT DOCUMENTS

| | | |
|---|---|---|
| JP | H03-43442 A | 2/1991 |
| JP | A-2004-352978 | 12/2004 |
| JP | 2006-152052 A | 6/2006 |
| JP | 2009-35582 A | 2/2009 |
| WO | WO-A1-98-50467 | 11/1998 |
| WO | WO-A1-01-12901 | 2/2001 |
| WO | WO-A2-2007-124400 | 11/2007 |
| WO | WO-A1-2013-084513 | 6/2013 |
| WO | WO-A1-2015-056757 | 4/2015 |
| WO | WO-A1-2016-039213 | 3/2016 |

OTHER PUBLICATIONS

Extended European Search Report dated Feb. 5, 2018 in corresponding European patent application 17183429.4 (7 pages).

* cited by examiner

*Primary Examiner* — Vickey Nerangis

(74) *Attorney, Agent, or Firm* — Faegre Drinker Biddle & Reath LLP

(57) ABSTRACT

A thermosetting resin composition includes a lignin derived from a lignocellulose, a lignocellulose fiber derived from the lignocellulose, and a thermosetting resin. In the thermosetting resin composition, the lignin derived from the lignocellulose and the lignocellulose fiber derived from the lignocellulose are dispersed in the thermosetting resin.

12 Claims, 1 Drawing Sheet

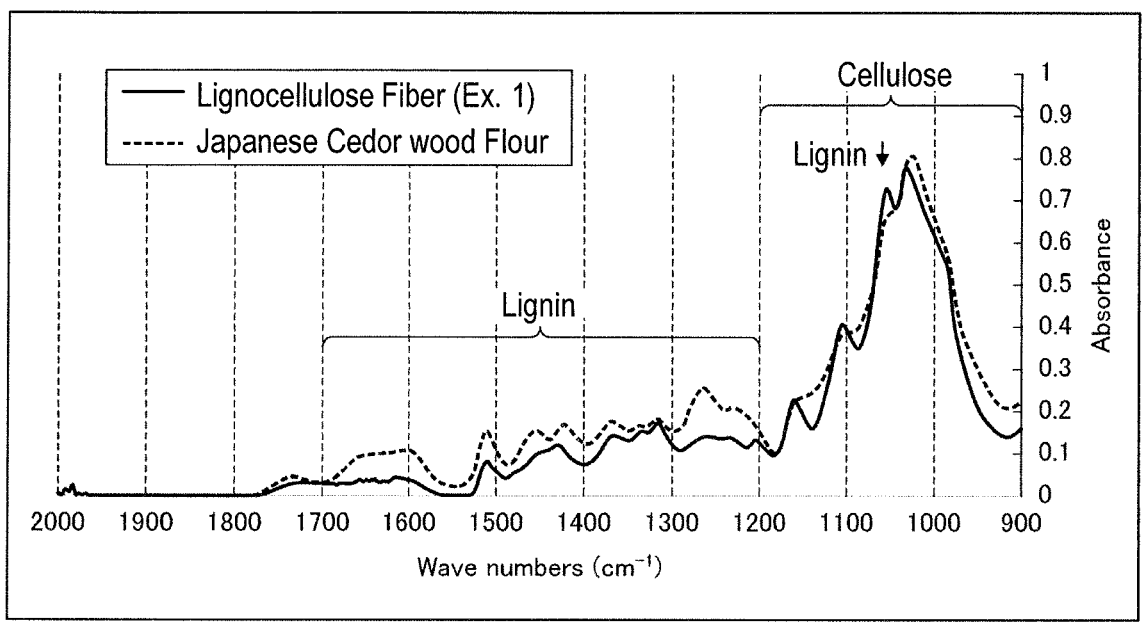

THERMOSETTING RESIN COMPOSITION, FRICTION MATERIAL AND METHOD FOR PRODUCING THERMOSETTING RESIN COMPOSITION

CROSS-REFERENCE TO RELATED APPLICATIONS

This application claims priority from Japanese Patent Application No. 2016-153748 filed on Aug. 4, 2016, the entire subject matter of which is incorporated herein by reference.

BACKGROUND OF THE INVENTION

Technical Field

The present invention relates to a thermosetting resin composition. In more detail, the present invention relates to a thermosetting resin composition suitable for use in a resin composition for a friction material to be used for brake pads, brake linings, clutch facings and the like in industrial machines, railway vehicles, freight cars, passenger cars and the like, a friction material using the thermosetting resin composition, and a method for producing the thermosetting resin composition.

Background Art

Thermosetting resins are used as a binder of a friction material, and of those, a phenol-based thermosetting resin has excellent heat resistance, dimensional stability, mechanical strength and the like, and is therefore widely used. In recent years, thermal and mechanical loads to a friction material are increasing, and a thermosetting resin capable of enhancing heat resistance and strength is required in thermosetting resins to be used as a binder. To respond to those requirements, various technologies are proposed for modifying (denaturing) a thermosetting resin and improving desired properties.

For example, Patent Document 1 proposes a thermosetting resin composition containing a triazine-modified resol-type phenol resin obtained by reacting (a) phenol monomers, (b) triazines, (c) aldehydes and (c) novolac-type phenol resins, as a thermosetting resin composition having excellent heat resistance and flexibility.

On the other hand, a problem of global warming due to the increase of carbon dioxide concentration in the atmosphere has recently been becoming a global problem, and techniques for reducing carbon dioxide emissions have been developed in various industrial fields. From the background, reuse of woody wastes such as barks, thinnings and building wastes is considered, and various resin compositions using the plant-derived material (plant-based biomass) are proposed.

For example, Patent Document 2 describes a method for forming a forming material by resinifying a solubilized material of lignocellulose in phenols in the presence of a formaldehyde source, and adding a filler and a curing agent to the resulting resin. Patent Document 3 describes a resin composition containing a dry lignocellulose-containing material, obtained by hydrolyzing a plant-derived material to obtain a lignocellulose-containing material containing lignin and cellulose in a proportion of $1 \leq r \leq 10$ ($r = A/B$, wherein A is parts by weight of lignin and B is parts by weight of cellulose), and drying the lignocellulose-containing material at 80° C. or lower.

Patent Document 1: JP-A-2006-152052
Patent Document 2: JP-A-H03-43442
Patent Document 3: JP-A-2009-35582

SUMMARY OF THE INVENTION

In the field of friction materials, consideration is required to wear debris generated from the friction materials and environmental load caused by the discarded friction materials from the standpoint of environmental preservation, and it is considered to use a resin composition using the plant-based biomass, as a binder.

However, the resin composition containing the plant-based biomass does not have sufficient strength as a reinforcing material, and is therefore not suitable for use as a resin composition for a friction material.

In view of the above, objects of the present invention are to provide a thermosetting resin composition modified by a plant-based biomass, more specifically a thermosetting resin composition capable of giving sufficient bending strength to a friction material even in the case of using as a resin composition for a friction material, a friction material containing the thermosetting resin composition, and a method for producing the thermosetting resin composition.

As a result of various investigations, the present inventors have found that, in a thermosetting resin composition in which the lignin and lignocellulose fibers, which are obtained by the decomposition of lignocellulose contained in a plant-based biomass, are dispersed in the thermosetting resin, the lignocellulose fibers function as a reinforcing material of the resin, and bending strength and elastic modulus of a resin formed body can be enhanced, and thus, the present invention has been completed.

That is, the present invention encompasses the following aspects.

(1) A thermosetting resin composition comprising: a lignin derived from a lignocellulose; a lignocellulose fiber derived from the lignocellulose; and a thermosetting resin, wherein the lignin and the lignocellulose fiber are dispersed in the thermosetting resin.

(2) The thermosetting resin composition according to (1), wherein a content ratio between the lignin and the lignocellulose fiber is 1:1 to 1:10 by mass ratio.

(3) The thermosetting resin composition according to (1) or (2), wherein a content of the lignocellulose fiber is 1 to 20% by mass.

(4) The thermosetting resin composition according to any one of (1) to (3), wherein the lignocellulose fiber has an average fiber length of 1,000 μm or less.

(5) The thermosetting resin composition according to any one of (1) to (4), wherein the thermosetting resin is a phenol resin.

(6) A friction material comprising the thermosetting resin composition according to any one of (1) to (5).

(7) The friction material according to (6), wherein a content of the thermosetting resin composition is 5 to 15% by mass.

(8) A method for producing a thermosetting resin composition, comprising:
mixing a plant-based biomass, a first acid and phenol, and heat-treating a mixture thereof, thereby obtaining a phenol solution in which a lignin and a lignocellulose fiber are dispersed in the phenol; and
reacting the phenol solution with an aldehyde in the presence of a second acid, thereby obtaining a thermosetting resin composition comprising the lignin dispersed and the lignocellulose fiber dispersed.

(9) The method according to (8), wherein at least one of the first acid and the second acid is oxalic acid.

(10) The method according to (8) or (9), further comprising melt-kneading the thermosetting resin composition.

In an aspect of the present invention, lignocellulose fibers function as a reinforcing material of a resin, and as a result, a resin formed body obtained from the thermosetting resin composition in an aspect of the present invention can enhance bending strength and elastic modulus as compared with a resin formed body obtained from conventional thermosetting resin(s). Furthermore, when the thermosetting resin composition in an aspect of the present invention has been added to a friction material, the friction material having excellent bending strength and enhanced elastic modulus can be provided.

BRIEF DESCRIPTION OF THE DRAWING

FIG. 1 is a view showing FT-IR measurement results of the phenol resin composition of Example 1 tested in Test Example 1.

DETAILED DESCRIPTION OF THE INVENTION

The thermosetting resin composition and friction material in an aspect of the present invention are described in detail below.

(Thermosetting Resin Composition)

The thermosetting resin composition (hereinafter sometimes simply referred to as "resin composition") in an aspect of the present invention includes a lignin derived from a lignocellulose, a lignocellulose fiber derived from the lignocellulose and a thermosetting resin, and the lignin and the lignocellulose fiber are dispersed in the thermosetting resin.

In the present specification, the term "derived from lignocellulose" means components originating from lignocellulose, and more specifically indicates a lignocellulose-based material obtained by decomposing lignocellulose contained in a plant-based biomass.

The lignocellulose is a plant cell wall component, and has a three-dimensional network layered structure in which cellulose is strongly bonded to a lignin and a hemicellulose. The cellulose forms a crystalline microfibril (cellulose nanofibers) including several tens monomolecules that are regularly aggregated and gathered. The lignocellulose contains the cellulose in an amount of about 45 to 50% by mass, the hemicellulose in an amount of about 15 to 30% by mass, and the lignin in an amount of about 25 to 35% by mass.

Examples of the plant-based biomass containing lignocellulose used in an aspect of the present invention include woody materials such as chips or barks of paper-making trees, forest scraps and thinned woods, sawdusts generated from sawmills and the like, pruned branches and leaves in tree-lined street, and building wastes; vegetation-based materials such as kenaf, rice straws, wheat straws, corn-cob and bagasse; and bacteria celluloses yielded by microorganisms. Specific examples of the woody materials include *Cryptomeria* plants, *Eucalyptus* plants, *Acasia* plants, *Salix* plants, *Populus* plants and the like. Of those, *Cryptomeria* plants and *Eucalyptus* plants that are easily available are preferably used.

Those plant-based biomasses may be used alone or as mixtures thereof.

The lignocellulose can be decomposed by conventional methods. Examples of the conventional methods include methods of applying a pretreatment to the lignocellulose as necessary, and then performing hydrolytic heating or thermal decomposition using an inorganic acid, an organic acid, an alkali, an enzyme, subcritical water, supercritical water or the like. Of those methods, a method of thermally decomposing the lignocellulose using an organic acid, not requiring a neutralization step after synthesis, is preferred from the standpoint of dispersion of the lignocellulose in a thermosetting resin composition.

The lignin, cellulose fibers and hemicellulose are obtained as lignocellulose-based materials by the decomposition of lignocellulose. In an aspect of the present invention, the lignocellulose is decomposed so as to become the state of cellulose fibers without decomposing cellulose up to cellulose simple substance. Furthermore, in the lignocellulose-based material obtained by decomposing the lignocellulose, the lignin and cellulose fibers are not completely separated to each other, and lignocellulose fibers in the state that lignin and cellulose fibers are bonded to each other are contained.

In the thermosetting resin composition in an aspect of the present invention, the lignin and lignocellulose fibers are dispersed in the thermosetting resin. The lignin has excellent dispersibility in a thermosetting resin. Therefore, it is presumed that when the thermosetting resin contains lignocellulose fibers including cellulose fibers having bonded thereto lignin, dispersibility of cellulose fibers in the thermosetting resin is enhanced and bending strength of a resin formed body formed from the thermosetting resin composition is enhanced.

The average fiber length of the lignocellulose fibers is preferably 1,000 μm or less, more preferably 30 to 500 μm, and still more preferably 50 to 300 μm, from the standpoint of dispersibility in the thermosetting resin. The lower limit of the average fiber length of the lignocellulose fibers is not particularly limited, but when the average fiber length is 30 μm or more, bending strength of a resin formed body formed from the thermosetting resin composition can be enhanced.

The content of the lignocellulose fibers in the thermosetting resin composition is preferably 1 to 20% by mass, more preferably 3 to 15% by mass, and still more preferably 5 to 12% by mass. When the content of the lignocellulose fibers in the thermosetting resin composition is 1% by mass or more, bending strength and elastic modulus of the resin formed body obtained can be enhanced as compared with a resin formed body using a thermosetting resin as a base resin. When the content of the lignocellulose fibers exceeds 20% by mass, strength of the resulting resin composition is too high, and elastic modulus of the resulting resin formed body may be deteriorated.

The content of the lignin in the thermosetting resin composition is preferably 0.1 to 15% by mass, more preferably 0.1 to 10% by mass, and still more preferably 1 to 5% by mass. When the content of lignin in the resin composition is within the range, moldability of the resin composition is improved, and this is preferred.

The content ratio between the lignin and the lignocellulose fibers (lignin:lignocellulose fibers) is preferably 1:1 to 1:10, more preferably 1:1 to 1:7, and still more preferably 1:1 to 1:5, by mass ratio. The lignocellulose is decomposed to the lignin and cellulose fibers. When the decomposition of the cellulose further proceeds, the cellulose is decomposed into a saccharide such as glucose and sucrose. In an aspect of the present invention, strength of the resin formed body can be enhanced by containing the cellulose in the state of lignocellulose fibers, and when the content ratio between the lignin and the lignocellulose fibers is within the above range, the desired effect in an aspect of the present invention can be achieved.

Examples of the thermosetting resin include a straight phenol resin, various modified phenol resins modified by an elastomer or the like, a melamine resin, an epoxy resin, a polyimide resin and the like. Examples of the elastomer-modified phenol resin include an acryl rubber-modified phenol resin, a silicone rubber-modified phenol resin, an NBR-modified phenol rubber and the like. Those thermosetting resins can be used alone or as mixtures of those. Phenol as a raw material of a phenol resin has a function as a catalyst during decomposing lignocellulose. Therefore, a phenol resin is preferably used from the standpoint that the phenol resin can be used as a decomposition catalyst of lignocellulose and as a raw material of a resin composition.

(Method for Producing Thermosetting Resin Composition)

A method for producing a thermosetting resin composition in an aspect of the present invention is described below.

The method for producing a thermosetting resin composition in an aspect of the present invention includes obtaining a phenol solution in which a lignin and lignocellulose fiber, which are obtained by decomposing a plant-based biomass, are dispersed in phenol, and polymerizing the phenol solution, thereby obtaining a thermosetting resin composition. More specifically, the method includes mixing a plant-based biomass, a first acid and phenol, and heat-treating a mixture thereof, thereby obtaining a phenol solution in which a lignin and lignocellulose fiber are dispersed in the phenol (first step), and reacting the phenol solution with an aldehyde in the presence of a second acid, thereby obtaining a thermosetting resin composition including the lignin dispersed and the lignocellulose fiber dispersed (second step).

(First Step)

In the method for producing a thermosetting resin composition in an aspect of the present invention, a plant-based biomass, a first acid and phenol are mixed, and the resulting mixture is heat-treated, thereby obtaining a phenol solution in which a lignin and lignocellulose fiber are dispersed in the phenol.

The above-described plant-based biomasses can be used as the plant-based biomass. The plant-based biomass is preferably subjected to a mechanical treatment to form a raw material powder having a desired particle diameter. Examples of the mechanical treatment include the following means of cutting, crushing, grinding and the like. The particle diameter of the raw material powder is adjusted such that its average particle diameter is preferably 500 μm or less, more preferably 1 to 300 μm, and still more preferably 10 to 200 μm. When the average particle diameter of the raw material powder is 500 μm or less, the average fiber length of the lignocellulose fibers obtained can be adjusted to 1,000 μm or less.

The amount of the plant-based biomass used is preferably 1 to 25 parts by mass, more preferably 3 to 20 parts by mass, and still more preferably 5 to 15 parts by mass, per 100 parts by mass of the phenol. When the amount of the plant-based biomass used is within the above range, the content of the lignocellulose fibers in the thermosetting resin composition can be adjusted to 1 to 20% by mass, and bending strength and elastic modulus of a resin formed body formed from the resin composition can be enhanced as compared with those of a resin formed body of a thermosetting resin as a base resin.

The first acid functions to develop the effect as a catalyst. Examples of the first acid include an organic acid such as oxalic acid, formic acid, acetic acid and the like, and an inorganic acid such as hydrochloric acid, sulfuric acid, nitric acid, phosphoric acid and the like. In materials of the friction material, an acid component is required to be neutralized in order to prevent the generation of rusts. However, the first acid is decomposed in the heating step by using a weakly acidic organic acid, and neutralization is not necessary. Therefore, oxalic acid, formic acid or acetic acid is preferably used in the production of a thermosetting resin composition for use in a resin composition for a friction material. The first acid is preferably oxalic acid.

The amount of the first acid is preferably 0.1 to 5.0 parts by mass, more preferably 0.5 to 4.5 parts by mass, and still more preferably 1.0 to 4.0 parts by mass, per 100 parts by mass of the phenol. When the amount of the first acid is within the above range, the reaction can sufficiently proceed, and as a result, the plant-based biomass can be appropriately decomposed into the lignin and lignocellulose fibers.

As the heat treatment conditions, the reaction is preferably conducted at a heating temperature of 100 to 180° C. for 1 to 6 hours. When the heating temperature is 100° C. or higher, the decomposition of the plant-based biomass can be accelerated, and when the heating temperature is 180° C. or lower, the plant-based biomass is decomposed into lignin, hemicellulose and lignocellulose fibers, and this is preferred. The heating temperature is more preferably 120 to 180° C., and still more preferably 150 to 180° C. When the heating time is 1 hour or more, the plant-based biomass can be sufficiently decomposed. The heating time is preferably 6 hours or shorter from the standpoint of productivity. The heating time is more preferably 1 to 4 hours, and still more preferably 1 to 3 hours.

The phenol solution in which the lignin and the lignocellulose fiber are dispersed in the phenol is obtained in the first step.

In an aspect of the present invention, the phenol has the function as a solvent for dispersing the lignin and lignocellulose fibers and also has the function as a catalyst for decomposing lignocellulose.

(Second Step)

The phenol solution obtained in the first step is reacted with an aldehyde in the presence of a second acid to obtain a thermosetting resin composition including the lignin dispersed and the lignocellulose fibers dispersed.

Examples of the aldehyde used for the preparation of the thermosetting resin composition include formaldehyde, glyoxal, acetaldehyde, chloral, furfural, benzaldehyde and the like. Those aldehydes may be used alone or as mixtures of those.

The amount of the aldehyde used is preferably 10 to 30 parts by mass per 100 parts by mass of the phenol solution. When the amount of the aldehyde is 10 parts by mass or more, monomers of phenols can be suppressed from remaining, and when the amount exceeds 30 parts by mass, the degree of polymerization of a resin composition may be excessively high.

The second acid is to develop the effect as a catalyst. The acids exemplified as the first acid in the first step can be used as the second acid in the second step, and the preferred acids are the same.

The same kind of acid may be used as the first acid and second acid, and oxalic acid is preferably used as the first acid and second acid.

The amount of the second acid used is preferably 0.1 to 10 parts by mass per 100 parts by mass of the phenol solution.

As reaction conditions of the preparation, the reaction is preferably conducted at a heating temperature of 70 to 110° C. for 1 to 12 hours. When the heating temperature is 70° C. or higher, polymerization is sufficiently conducted, which is preferred. When the heating temperature is 110° C. or lower, thermal decomposition does not occur, which is preferred. The heating temperature is more preferably 80 to 100° C., and still more preferably 90 to 100° C. When the heating time is 1 hour or more, polymerization sufficiently proceeds. The heating time is preferably 12 hours or less from the standpoint of productivity. The heating time is more preferably 2 to 10 hours, and still more preferably 4 to 8 hours.

The phenol-based thermosetting resin composition modified with lignin and lignocellulose fibers is obtained in the second step.

(Third Step)

The method for producing a thermosetting resin composition in an aspect of the present invention preferably further includes melt-kneading the thermosetting resin composition obtained in the second step. The lignocellulose fibers are bunched together and are present in the resin composition obtained in the second step, and dispersibility is not uniform in some cases. For this reason, by melt kneading the thermosetting resin composition, the lignin and lignocellulose fibers can be uniformly dispersed therein.

The melt kneading can be conducted by conventional melt kneading method(s), and, for example, a plastograph, a plastomill, Banbury mixer, single screw or twin screw extruder, or the like can be used.

As the conditions of melt kneading, the melt kneading is preferably conducted at a heating temperature of 100 to 180° C. for 10 to 120 minutes. When the heating temperature is 100° C. or higher, the melt kneading can be conducted without thermally decomposing components. When the heating temperature is 180° C. or lower, dispersibility of the lignocellulose fibers is improved, which is preferred. The heating time is more preferably 110 to 170° C., and still more preferably 120 to 160° C. When the heating time is 10 minutes or more, dispersibility of lignocellulose fibers can be enhanced. Even though the heating time exceeds 120 minutes, the dispersibility does not greatly change. The heating time is more preferably 20 to 100 minutes, and still more preferably 30 to 90 minutes.

(Friction Material)

The thermosetting resin composition in an aspect of the present invention can be suitably used as a binder of a friction material. The friction material is described below.

The friction material in an aspect of the present invention comprises a fiber base material, a friction modifier and a binder, and the thermosetting resin composition of the present invention is contained in the friction material as the binder.

The fiber base material is used for reinforcing in the case of forming a friction material. Examples of fiber base material include organic fibers, inorganic fibers, metal fibers and the like. Examples of the organic fibers include aromatic polyamide (aramid) fibers, flame-resistant acrylic fibers, cellulose fibers and the like. Examples of the inorganic fibers include biosoluble fibers, glass fibers, carbon fibers and the like. Examples of the metal fibers include steel fibers, aluminum fibers, zinc fibers, tin or tin alloy fibers, stainless steel fibers, copper or copper alloy fibers and the like. The fiber base materials can be used alone or as mixtures of those.

Of those fiber base materials, aramid fibers are preferably used alone or in combination with other fiber base material(s). Biosoluble fibers are preferably used as the other fiber base materials from the standpoint of less influence to a human body. Examples of the biosoluble fibers include biosoluble ceramic fibers such as $SiO_2$—CaO—MgO fibers, $SiO_2$—CaO—MgO—$Al_2O_3$ fibers and $SiO_2$—MgO—SrO fibers, and biosoluble rock wools.

The content of the fiber base material is preferably 1 to 20% by mass, and more preferably 3 to 15% by mass, based on the entire friction material in order to ensure sufficient mechanical strength.

A friction modifier is used to give desired friction properties such as abrasion resistance, heat resistance, and fade resistance to the friction material.

Examples of the friction modifier include inorganic fillers such as alumina, barium sulfate, calcium carbonate, calcium hydroxide, vermiculite, mica, potassium titanate, lithium potassium titanate and magnesium potassium titanate; abrasives such as silica, magnesia, zirconia, zirconium silicate, chromium oxide and tri-iron teraoxide ($Fe_3O_4$); metal powders such as aluminum, zinc and tin; various rubber powders (rubber dust, tire powder and the like); organic fillers such as cashew dust and melamine dust; solid lubricants such as graphite, molybdenum disulfide, tin sulfide and polytetrafluoroethylene (PTFE), and the like. Those friction modifiers can be used alone or as mixtures of those.

The content of the friction modifier is appropriately adjusted depending on desired friction properties. The content is preferably 60 to 90% by mass, and more preferably 70 to 90% by mass, based on the entire friction material.

The binder is used to integrate the fiber base material contained in the friction material with the friction modifier contained therein. In the friction material in an aspect of the present invention, the thermosetting resin composition in an aspect of the present invention can be suitably used.

The content of the thermosetting resin composition in an aspect of the present invention is preferably 5 to 15% by mass, and more preferably 7 to 13% by mass, based on the entire friction material in order to ensure sufficient mechanical strength and abrasion resistance.

The friction material in an aspect of the present invention may contain at least one resin that can be generally used as a binder for a friction material, as the other binder. Examples of the other binder include straight phenol resin, various modified resins modified by an elastomer or the like, and thermosetting resins such as a melamine resin, an epoxy resin and a polyimide resin. Examples of the elastomer-modified phenol resin include acryl rubber-modified phenol resin, silicone rubber-modified phenol resin, NBR-modified phenol resin and the like.

The friction material in an aspect of the present invention can contain the other material(s) as necessary, other than the above-described fiber base material, friction modifier and binder.

The production of the friction material in an aspect of the present invention can be conducted by conventional production steps. For examples, the friction material can be produced through steps of preforming, thermoforming, heating, grinding and the like of the friction material composition.

General steps in the production of a brake pad for a disc brake is described below.

(a) Step of forming a steel plate (pressure plate) into a predetermined shape by sheet metal press.

(b) Step of subjecting the pressure plate to a degreasing treatment, a chemical conversion treatment and a primer treatment and then applying an adhesive to the treated pressure plate.

(c) Step of blending powder raw materials of a fiber base material, a friction modifier, a binder and the like, mixing the resulting mixture to obtain a sufficiently homogenized friction material composition, and forming the composition at room temperature under a given pressure to prepare a pre-formed body.

(d) Thermally forming step of integrally fixing the pre-formed body to the pressure plate having applied thereto an adhesive at a predetermined temperature under a predetermined pressure (forming temperature: 130 to 180° C., forming pressure: 30 to 80 MPa and forming time: 2 to 10 minutes).

(e) Step of conducting after-curing (150 to 300° C., 1 to 5 hours), and finally applying a finish treatment such as grinding, scorching, painting and the like to the resulting integrally fixed product.

A brake pad for a disc brake, including the friction material in an aspect of the present invention can be produced by the above steps.

Copper component such as fibers or particles of copper or copper alloy is added to a friction material in order to ensure fade resistance. However, in the friction material containing a copper component, the copper component is released into the air as wear debris by braking. Therefore, the influence to natural environment is pointed out. In view of this, efforts are being made to restrict use of copper or the like in a brake pad for automobiles, and various copper-free friction materials are proposed. The friction material in an aspect of the present invention can be suitably used in a so-called copper-free and non-asbestos friction material having a content of copper, as an element, of 0.5% by mass or less. Furthermore, the friction material in an aspect of the present invention can be applied to low-steel and copper-free material.

The friction material in an aspect of the present invention can be suitably used as a friction material of a brake pad, brake lining and the like in automobiles and the like.

EXAMPLES

The present invention is further described below by reference to examples and comparative examples, but the present invention should not be construed as being limited to the following examples.

Example 1

20 g of Japanese cedar wood flour (manufactured by Toyama West Forest Guild) having an average particle diameter ($D_{50}$) of 21 μm, 180 g of phenol (manufactured by Wako Pure Chemical Industries, Ltd.) and 5.4 g of oxalic acid (manufactured by Wako Pure Chemical Industries, Ltd.) were weighed and placed in a four-necked flask equipped with Dimroth condenser, a thermometer and a stirrer, followed by fluxing under heating at 170° C. for 2 hours.

124 g of a 37% formaldehyde solution (manufactured by Wako Pure Chemical Industries, Ltd.) and 1.3 g of oxalic acid were added thereto and the resulting mixture was refluxed under heating at 100° C. for 6 hours.

After refluxing under heating, vacuum distillation was conducted while increasing the temperature to 180° C., and water and unreacted phenol were distilled away. Thus, a solid phenol resin composition (lignocellulose fiber-composited phenol resin composition) in which lignin and lignocellulose fibers, which were in Japanese cedar wood flour, were dispersed in the phenol resin was obtained.

Example 2

A phenol resin composition was prepared in the same manner as in Example 1, except for using Japanese cedar wood flour (manufactured by Toyama West Forest Guild) having an average particle diameter ($D_{50}$) of 115 μm.

Example 3

A phenol resin composition was prepared by further melt kneading the phenol resin composition prepared in Example 2 at 150° C. for 30 minutes using plastograph "Plasti-coder Lab-station (trade name), manufactured by Brabender".

Example 4

A phenol resin composition was prepared in the same manner as in Example 3, except that the melt kneading time was changed to 60 minutes.

Comparative Example 1

A straight phenol resin manufactured by Sumitomo Bakelite Co., Ltd. was used.

Test Example 1

Content of lignocellulose fibers and an average fiber length of lignocellulose fibers in the phenol resin compositions of Examples 1 and 2 were measured, and FT-IR of the phenol resin composition of Example 1 was measured.
(Content of Lignocellulose Fibers and Average Fiber Length of Lignocellulose Fibers)

1 g of the phenol resin composition was added to 100 g of acetone, followed by stirring, thereby dissolving the phenol resin composition in acetone. Lignocellulose fibers insoluble in acetone were collected by a glass fiber filter paper (Whatman GF/F), and dried at 110° C. for 1 hour. The weight of the lignocellulose fibers weighed after drying was divided by 1 g of the phenol resin composition to calculate the content (%) of lignocellulose fibers. The fiber lengths of 50 lignocellulose fibers per one sample were measured using a digital microscope ("VHX-500" (trade name), manufactured by Keyence Corporation) and an average value thereof was calculated. Thus, an average fiber length of the lignocellulose fibers was measured.

The results obtained are shown in Table 1 below

TABLE 1

| | Example 1 | Example 2 |
|---|---|---|
| Average fiber length (μm) of lignocellulose fibers | 82 | 249 |
| Content (wt %) of lignocellulose fibers | 7 | 5 |

(FT-IR)
FT-IR of the lignocellulose fibers collected as above was measured by ATR method (total reflection absorption measuring method, incidence angle: 45°) using FT-IR equipment ("Nicolet Nexus 470" (trade name), manufactured by THERMO SCIENTIFIC). The results obtained are shown in FIG. 1.

It was found from Table 1 that lignocellulose fibers were contained in the phenol resin compositions of Examples 1 and 2. From FIG. 1, the absorptions (1050 $cm^{-1}$ and 1200 to 1700 $cm^{-1}$) originated from lignin observed in Japanese cedar wood flour decreased in the lignocellulose fibers, but there was no great difference in the absorptions (900 to 1200 $cm^{-1}$, excluding 1050 $cm^{-1}$) originated from cellulose between Japanese cedar wood flour and lignocellulose fibers. It was found from the results that the phenol resin composition of Example 1 contained lignocellulose fibers that were not solubilized.

Test Example 2

Exothermic peak temperature and gelation time of the phenol resin compositions of Examples 1 to 4 and the phenol resin of Comparative Example 1 were measured.
(Exothermic Peak Temperature)
10 mg of the phenol resin composition or the phenol resin was weighed and placed in 10 mg measuring container, and was measured from room temperature to 300° C. at a temperature rising rate of 5° C./min using a differential scanning calorimeter (DSC) (Thermoplus EV02 (trade name), manufactured by Rigaku Corporation). Exothermic peak originated from a thermosetting reaction of the resin was observed at a temperature of 100 to 250° C., and its peak temperature was read.
(Gelation Time)
1 g of the phenol resin composition or the phenol resin was placed on a hot plate set to 150° C., and the time when the composition or resin was stirred by a dispending spoon and did not become stringy was measured.
The results of the exothermic peak temperature and gelation time are shown in Table 3.

Test Example 3

Hexamethylenetetramine as a curing agent was added to each of the phenol resin compositions of Examples 1 to 4 such that the content thereof was 10% by mass, and the resulting mixture was sufficiently kneaded.
Each mixture was formed at a forming temperature of 200° C. under a forming pressure of 50 MPa for a forming time of 400 seconds using a hot press, followed by heating at 200° C. for 3 hours. Thus, a resin formed body was obtained.
A resin formed body of the phenol resin in Comparative Example 1 was obtained in the same manner as above.
The resin formed bodies obtained above were subjected to the following bending test and measurement of coefficient of thermal expansion (CTE).
(Bending Test)
A test piece having a size of 50 mm×10 mm×2 mm was cut out of the resin formed body, and bending strength and bending elastic modulus at room temperature and 200° C. of the test piece were measured according to JIS-K7171.
(Coefficient of Thermal Expansion (CTE))
A test piece having a size of 5 mm×5 mm×2 mm was cut out of the resin formed body, and displacement of the test piece was measured in a nitrogen atmosphere at a temperature rising rate of 5° C./min in a temperature range of from 30 to 200° C. under a load of 5 gf using a thermomechanical analyzer ("TMA/SS7300" (trade name), manufactured by Hitachi Hi-Tech Science Corporation). From the measurement results, a coefficient of thermal expansion at 180 to 200° C. was calculated by a gradient of a tangential line of the displacement.

The results of the above bending test and coefficient of thermal expansion are shown in Table 3.

Test Example 4

A friction material was prepared in each formulation shown in Table 2 using each of the phenol resin compositions of Examples 1 to 4 and the phenol resin of Comparative Example 1. More specifically, materials to be blended shown in Table 2 were placed together in a mixing stirrer, followed by mixed at room temperature for 5 minutes to obtain a friction material composition. The friction material composition obtained was passed through the following steps of (1) preforming, (2) thermoforming and (3) heating, thereby preparing a brake pad including the friction material.
(1) Preforming
The friction material was placed in a mold of a preforming press, and formed at room temperature under 20 MPa for 10 seconds to prepare a preform.
(2) Thermoforming
The preform was placed in a preforming mold, a metal plate (pressure plate; P/P) having previously applied thereto an adhesive was overlaid thereon, and the resulting assembly was formed under heating and pressurizing at a temperature of 150° C. under a pressure of 50 MPa for 5 minutes.
(3) Heating
The heated and pressurized formed body was heat-treated at a temperature of 250° C. for 3 hours, and then grinded. Finish painting was conducted to obtain a brake pad including the friction material.
Bending test of the brake pad obtained was conducted.
(Bending Test)
A test piece having a size of 5 mm×10 mm×2 mm was cut out of the friction material, and bending strength and bending elastic modulus at room temperature and 300° C. of the test piece were measured according to JIS-K7171. The results obtained are shown in Table 3.

TABLE 2

|  | Example 1 | Example 2 | Example 3 | Example 4 | Comparative Example 1 |
| --- | --- | --- | --- | --- | --- |
| Phenol resin | — | — | — | — | 10 |
| Phenol resin composition | 10 | 10 | 10 | 10 | — |
| Aramid pulp | 5 | 5 | 5 | 5 | 5 |
| Potassium titanate | 25 | 25 | 25 | 25 | 25 |
| Barium sulfate | 35 | 35 | 35 | 35 | 35 |
| Graphite | 5 | 5 | 5 | 5 | 5 |
| Cashew dust | 5 | 5 | 5 | 5 | 5 |
| Zirconium silicate | 10 | 10 | 10 | 10 | 10 |
| Calcium hydroxide | 2 | 2 | 2 | 2 | 2 |
| Mica | 3 | 3 | 3 | 3 | 3 |
| Total | 100 | 100 | 100 | 100 | 100 |

(Unit: % by mass)

TABLE 3

|  | Ex. 1 | Ex. 2 | Ex. 3 | Ex. 4 | Comp. Ex. 1 |
| --- | --- | --- | --- | --- | --- |
| Content of lignocellulose fibers (wt %) | 7 | 5 | 7 | 5 | — |
| Melt kneading time (min) | — | — | 30 | 60 | — |

TABLE 3-continued

|  |  |  |  |  | Ex. 1 | Ex. 2 | Ex. 3 | Ex. 4 | Comp. Ex. 1 |
|---|---|---|---|---|---|---|---|---|---|
| Evaluation results | Resin composition | Exothermic peak temperature (° C.) |  |  | 142 | 144 | 140 | 141 | 141 |
|  |  | Gelation time (sec) |  |  | 84 | 86 | 82 | 80 | 88 |
|  | Resin formed body | Coefficient of thermal expansion (CTE) | 180 to 200° C. (ppm/° C.) |  | 66 | 65 | — | — | 110 |
|  |  | Bending test | Room temperature | Strength (MPa) | 82 | 88 | 98 | 104 | 86 |
|  |  |  |  | Elastic modulus (GPa) | 6.1 | 6.1 | 6.2 | 6.1 | 6.0 |
|  |  |  | 200° C. | Strength (MPa) | 52 | 61 | 61 | 60 | 41 |
|  |  |  |  | Elastic modulus (GPa) | 2.6 | 3.2 | 3.1 | 3.2 | 1.5 |
|  | Friction material | Bending test | Room temperature | Strength (MPa) | 25 | 26 | 30 | 29 | 22 |
|  |  |  |  | Elastic modulus (GPa) | 8.5 | 9.0 | 9.7 | 10.1 | 6.9 |
|  |  |  | 300° C. | Strength (MPa) | 18 | 19 | 19 | 20 | 11 |
|  |  |  |  | Elastic modulus (GPa) | 6.0 | 6.2 | 6.0 | 6.6 | 3.4 |

It was found from the results in Table 3 that the phenol resin compositions of Examples 1 to 4 show thermosetting properties equivalent to those of the phenol resin of Comparative Example 1, the resin formed bodies and friction materials obtained from the phenol resin compositions of Examples 1 to 4 have enhanced bending strength and bending elastic modulus as compared with the resin formed body and friction material obtained using the conventional phenol resin of Comparative Example 1, and the coefficient of thermal expansion at 180 to 200° C. of the resin formed body in the Examples is small.

While the present invention has been described in detail and with reference to specific embodiments thereof, it will be apparent to one skilled in the art that various changes and modifications can be made therein without departing from the spirit and scope thereof.

The invention claimed is:

1. A thermosetting resin composition comprising:
    a lignin obtained by decomposing a lignocellulose;
    a lignocellulose fiber obtained by decomposing the lignocellulose; and
    a phenol resin,
    wherein after the lignocellulose is decomposed, the lignin and the lignocellulose fiber obtained therefrom are dispersed in the phenol resin, and
    wherein a content of the lignocellulose fiber is 1 to 20% by mass.

2. The thermosetting resin composition according to claim 1, wherein a content ratio between the lignin and the lignocellulose fiber is 1:1 to 1:10 by mass ratio.

3. The thermosetting resin composition according to claim 2, wherein the lignocellulose fiber has an average fiber length of 1,000 μm or less.

4. The thermosetting resin composition according to claim 1, wherein the lignocellulose fiber has an average fiber length of 1,000 μm or less.

5. A method for producing the thermosetting resin composition as described in claim 1, comprising:
    mixing phenol with the lignin and the lignocellulose fiber to form a phenol solution; and
    reacting the phenol solution with an aldehyde, thereby obtaining the thermosetting resin composition comprising the lignin dispersed and the lignocellulose fiber dispersed.

6. The method according to claim 5, further comprising melt-kneading the thermosetting resin composition.

7. A friction material comprising the thermosetting resin composition according to claim 1.

8. The friction material according to claim 7, wherein a content of the thermosetting resin composition is 5 to 15% by mass.

9. A friction material comprising the thermosetting resin composition according to claim 2.

10. The friction material according to claim 9, wherein a content of the thermosetting resin composition is 5 to 15% by mass.

11. A friction material comprising the thermosetting resin composition according to claim 4.

12. The friction material according to claim 11, wherein a content of the thermosetting resin composition is 5 to 15% by mass.

* * * * *